United States Patent Office 3,424,712
Patented Jan. 28, 1969

3,424,712
STABILIZED RESINS CONTAINING A PHENOL AND A STANNOIC ACID
Joel B. Gottlieb, Metuchen, and William E. Mayo, South River, N.J., assignors to M & T Chemicals Inc., New York, N.Y., a corporation of Delaware
No Drawing. Filed Jan. 3, 1966, Ser. No. 517,967
U.S. Cl. 260—45.75  16 Claims
Int. Cl. C08f 45/62, 45/58

ABSTRACT OF THE DISCLOSURE

In accordance with certain of its aspects, the process of this invention for preparing a composition stabilized against the deteriorative effect of heat comprises adding to a halogen-containing polymer a stabilizing amount of a first stabilizer having the formula $(RSnX_{1.5})_n$ wherein R is selected from the group consisting of alkyl having 1–20 carbon atoms, aryl, alkaryl, aralkyl, and cycloalkyl, X is selected from the group consisting of oxygen and sulfur and mixtures of 1–10 parts of oxygen with 10–1 parts of sulfur, and $n$ is an integer 2–1000; and a second stabilizer having the formula

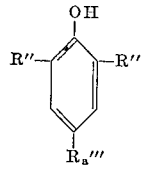

wherein $R''$ is a branched alkyl containing less than about 10 carbon atoms, $R'''$ is an alkyl containing less than about 10 carbon atoms, and $a$ is a number 0–1.

---

This invention relates to a method for stabilizing halogen-containing polymers including polyvinyl chloride and to novel stabilized halogen containing polymer compositions.

As is well known to those skilled-in-the-art, various halogen containing organic polymers, particularly vinyl halide polymers which include homopolymers of vinyl chloride and copolymers of vinyl chloride with other monomers, may degrade when subjected to heat over an extended period of time as evidenced by darkening of the resin and by an increase in brittleness. These deflects may render the resin unsuitable for many uses since the darkening produces an unsightly appearance, and the increased brittleness may cause mechanical failures. A wide variety of materials has heretofore been employed to stabilize halogen-containing polymers. Many of these additives have achieved some measure of success in stabilizing halogen-containing resins against the degradative action of heat, but there are many applications in which a greater degree of heat stability is desired than has heretofore been readily attainable.

It is particularly characteristic of prior art stabilizing systems that they may not fully prevent the deterioration of resins or polymers including polyvinyl chloride during the period when the resins and stabilizer composition may be maintained on the hot mill on which they are blended. During this period, which may be 5–30 minutes or longer, the various ingredients including, e.g. pigment, plasticizer, stabilizer, lubricant, etc., may be mixed with the resin and the mixture subjected to the influence of heat and pressure to form a substantially homogeneous mixture. During this period of severe heating (typically at 175° C. or higher) the resin may deteriorate much more quickly than under normal processing or handling conditions. Thus the product coming from the Banbury Mill-Blender or extruder may be darker than is desirable.

Those skilled-in-the-art have heretofore attempted to eliminate this deterioration resulting from heat by addition of various materials including auxiliary heat stabilizers. It has been found however that the presence of these additional materials results in undesirable side effects which may unsatisfactorily modify the desired properties of the resin or polymer. Accordingly it has heretofore not been possible to prepare resin compositions which may be stabilized in totally satisfactory manner against the deteriorative effect of heat.

It is an object of this invention to provide a method for stabilizing halogen-containing organic polymer or resin compositions particularly vinyl halide polymers against heat deterioration. It is a further object of this invention to provide novel stabilized halogen-containing polymers. Other objects will be apparent to those skilled-in-the-art from inspection of the following description.

In accordance with certain of its aspects, the process of this invention for preparing a composition stabilized against the deteriorative effect of heat comprises adding to a halogen-containing polymer a stabilizing amount of a first stabilizer having the formula $(RSnX_{1.5})_n$ wherein R is selected from the group consisting of alkyl having 1–20 carbon atoms, aryl, alkaryl, aralkyl, and cycloalkyl, X is selected from the group consisting of oxygen and sulfur and mixtures of 1–10 parts of oxygen with 10–1 parts of sulfur, and $n$ is an integer 2–1000; and a second stabilizer having the formula

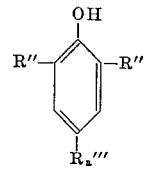

wherein $R''$ is a branched alkyl containing less than about 10 carbon atoms, $R'''$ is an alkyl containing less than about 10 carbon atoms, and $a$ is a number 0–1.

The polymers or resins which may be stabilized by practice of this invention may be halogen-containing organic polymers typically those which contain chlorine atoms bonded to the polymer chain. These polymers may be homopolymers including polyvinyl chloride-type polymers, e.g. polyvinyl chloride, polyvinylidene chloride, etc. They may also include copolymers formed by the copolymerization of vinyl chloride or vinylidene chloride with other ethylenically unsaturated monomers. Ethylenically unsaturated monomers may be compounds which contain polymerizable carbon-to-carbon double bonds and may include acrylates such as acrylic acid, ethyl acrylate, acrylonitrile, etc.; vinyl monomers such as styrene, vinyl acetate, etc.; maleates such as maleic acid, maleic anhydride, maleate esters, etc. For convenience, reference will be hereinafter made to viny chloride polymers. The polymers may be either "rigid" or "flexible." With "rigid" polymers are employed, they may include impact modifiers, pigments and/or fillers, lubricants, etc., in addition to the resin and stabilizer. When "flexible" polymers are employed, they may include plasticizer (primary and secondary), pigments and/or fillers, lubricants, etc. in addition to the resin and stabilizer.

The vinyl chloride polymers may also contain plasticizers such as dioctyl phthalate; lubricating agents such as stearic acid; pigments; fillers; etc.

The first stabilizer which may find use in certain aspects of this invention may have the formula $(RSnX_{1.5})_n$. In this compound, R may be a hydrocarbon radical preferably selected from the group consisting of alkyl, cycloalkyl, aralkyl, aryl, alkaryl, including such radicals when inertly substituted. When R is alkyl, it may typically be straight chain alkyl or branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl i.e. having less than about 8 carbon atoms i.e. octyls and lower. When R is cycloalkyl, it may typically be cyclopentyl, cyclohexyl, cycloheptyl, cyclooctyl, etc. When R is aralkyl, it may typically be benzyl, β-phenylethyl, γ-phenylpropyl, β-phenylpropyl, etc. When R is aryl, it may typically be phenyl, naphthyl, etc. When R is alkaryl, it may typically be tolyl, xylyl, p-ethylphenyl, p-nonylphenyl, etc. R may be inertly substituted, e.g., may bear a non-reactive substituent such as alkyl, aryl, cycloalkyl, aralkyl, alkaryl, ether, etc. Typical substituted alkyls include, 2-ethoxyethyl, etc. Substituted cycloalkyls include 4-methylcyclohexyl, etc. Inertly substituted aryl includes anisyl, biphenyl, etc. Inertly substituted aralkyl includes chlorobenzyl, p-phenylbenzyl, p-methylbenzyl, etc. Inertly substituted alkaryl includes 2,6-di-tert-butyl-4-methylphenyl, etc.

The first stabilizer which may find use in certain aspects of this invention may be a thiostannonic acid or a stannoic acid viz. alkyl thiostannonic acid (also referred to as alkyl thiostannoic acid), aralkyl thiostannoic acid, alkaryl thiostannoic acid, etc.; and similarly for the stannoic (i.e. stannoic) acids. For convenience, the term *stannoic* will be employed rather than the term stannonic.

Polymeric stannoic acids and thiostannoic acids may include the condensation products of stannoic acid and thiostannoic acid respectively, the products having degrees of condensation of 2 to about 1,000 and preferably 2–100.

These compounds may be represented by the formula:

$$(RSnX_{1.5})_n \qquad (I)$$

where X is oxygen, sulfur, and mixtures of 1–10 parts of oxygen with 10–1 parts of sulfur, i.e. mixtures containing these elements in a weight proportion between 1:10 and 10:1 and $n$ may be 2–1000, preferably 2–100.

Polymeric alkyl-stannoic acids may correspond to Formula II infra and polymeric alkyl-thiostannoic acids may correspond to Formula III infra. In the co-condensation products, units of, e.g., alkylstannoic acid may alternate with units of, e.g., alkyl-thiostannoic acid in accordance with Formula IV given below, in which case $m$ and $n$ may each be 2–1000, preferably 2–100.

$$(RSnO_{1.5})_n \qquad (II)$$

$$(RSnS_{1.5})_n \qquad (III)$$

$$(RSnO_{1.5})_m(RSnS_{1.5})_n \qquad (IV)$$

The R group of the polymeric stannoic acids or thiostannoic acids may preferably include alkyl groups which contain 1–20 carbon atoms and preferably 4 carbon atoms. Other stannoic acids including polymeric aryl stannoic acids and cycloalkyl-stannoic acids and aryl-thiostannoic acid and cycloalkyl-thiostannoic acids may be effective; but the alkyl compounds may be preferred.

The above compositions may be prepared for example by the reaction of RSnCl$_3$, typically butyltin trichloride with alkaline hydrolyzing agents such as ammonia, sodium hydroxide, etc. to yield e.g. (RSnO$_{1.5}$)$_n$ or with sodium sulfide Na$_2$S to yield e.g. (RSnS$_{1.5}$)$_n$ wherein $n$ may be as defined supra. If RSnCl$_3$ be reacted, e.g., in aqueous medium with less than equivalent amount of sulfide, the product may be (RSnO$_{1.5}$)$_m$(RSnS$_{1.5}$)$_n$ containing both oxygen and sulfur.

The preferred compounds may be those having the formula (RSnS$_{1.5}$)$_n$ wherein the R group is a lower alkyl group, and most preferably butyl. Preferably also the compounds employed may be those wherein $n$ may be about 2–100.

Preferred first stabilizers may typically include: methyl thiostannoic acid (CH$_3$SnS$_{1.5}$)$_n$ wherein $n$ may be 2–1000; butyl thiostannoic acid (C$_4$H$_9$SnS$_{1.5}$)$_n$ wherein $n$ may be 2–1000; n-octyl thiostannoic acid (n-C$_8$H$_{17}$SnS$_{1.5}$)$_n$ wherein $n$ may be 2–1000.

The second stabilizer which may find use in the practice of this invention may be a compound of the formula

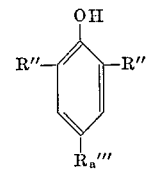

wherein R″ is a branched alkyl radical containing less than about 10 carbon atoms. R″ may be, for example, isopropyl, tert-butyl, sec-butyl, isobutyl, sec-butyl, isobutyl, sec-amyl, tert-amyl, isoamyl, and corresponding branched hexyl radicals, heptyl radicals, octyl radicals, nonyl radicals, etc. Preferably both of the R″ radicals may be the same. Preferred R″ radicals may be branched alkyl radicals containing 3–5 carbon atoms, e.g. branched propyl, butyl, and amyl radicals. The tert-butyl radical may be highly preferred.

The radical R‴ may be an alkyl radical containing less than about 10 carbon atoms. The radical R‴ may be a branched chain alkyl radical which may be the same as or different from the R″ branched alkyl radicals. R‴ may also be a straight chain alkyl radical such as methyl, ethyl, n-propyl, n-butyl, n-amyl, n-hexyl, n-heptyl, n-octyl, n-nonyl, etc. Preferably R‴ may be alkyl containing 1–4 carbon atoms, e.g. methyl, ethyl, propyl, and butyl.

Typical second stabilizers which fall within the above description include:

2,6-di-tert-amyl-p-cresol
2,6-di-tert-butyl-p-cresol
2,6-di-isopropyl-4-ethylphenol
2,6-di-tert-butyl-4-nonylphenol
2,4,6-tri-tert-butylphenol
2,6-di-isoamyl-4-ethylphenol
2,6-di-tert-amyl-4-n-amylphenol
2,6-di-isobutyl-p-cresol
2,6-di-sec-butyl-4-n-propylphenol
2,6-di-tert-butylphenol
2,6-di-isopropylphenol
2,6-di-tert-amylphenol
2,6-di-isobutylphenol etc. Preferred second stabilizers may include:

2,6-di-tert-butyl-p-cresol
2,4,6-tri-isopropylphenol
2,6-di-tert-butylphenol.

The first and second stabilizers may be present in stabilizing amounts. Typically the first stabilizer (RSnX$_{1.5}$)$_n$ may be used in amount of 0.1–10 parts by weight per 100 parts by weight of halogen-containing organic polymer typically polyvinyl chloride. Preferably it may be used in the amount of 0.25–2, say 0.35 part per 100 parts of halogen-containing resin.

Typically the second stabilizer may be employed in the amount of 0.05–2 parts by weight per 100 parts by weight of halogen-containing resin. Preferably, the amount used may be about 0.1–0.5 part, say 0.2 part per 100 parts of halogen-containing organic polymer.

Thus the preferred heat stable polymer compositions of this invention may comprise 100 parts by weight of a halogen-containing organic polymer; a stabilizing amount typically 0.1–10 parts, of a first stabilizer having the formula (RSnX$_{1.5}$)$_n$ wherein R is selected from the group consisting of alkyl radicals having 1–20 carbon atoms, aryl radicals, alkaryl radicals, aralkyl radicals, cycloalkyl radicals; X is selected from the group consisting of oxygen and sulfur and mixtures of 1–10 parts of oxygen with 10–1 parts of sulfur and $n$ is an integer between 2 and about 1000, and a stabilizing amount, typically 0.05–2 parts by weight, of a second stabilizer having the formula

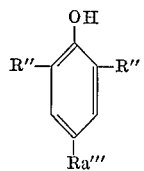

wherein R'' is a branched alkyl containing less than about 10 carbon atoms, R''' is an alkyl containing less than about 10 carbon atoms and $a$ is a number 0–1.

The novel heat stable composition of this invention may be formulated for example by milling, dry blending, Banbury mixing, etc.

One of the formulating methods which may be particularly preferred includes the formation of a stabilizer composition containing the first stabilizer and the second stabilizer. This stabilizer composition may be added to, and thoroughly mixed with, the preferred vinyl chloride polymer. Where this technique is employed, the stabilizer composition may typically comprise stabilizing amounts of the stabilizers, typically 0.1–10 parts by weight of the first stabilizer and 0.05–2.0 parts by weight of the second stabilizer. Preferably, it may comprise about 0.25–2, say 0.35 part of the first stabilizer and about 0.1–0.5, say 0.1 of the the second stabilizer.

Whatever formulating technique be employed, it may be desirable to substantially completely and uniformly disperse the first stabilizer and the second stabilizer throughout the vinyl chloride polymer composition. It is a feature of the novel stabilizer system of this invention that it permits attainment of stabilized halogen-containing polymers and resins, particularly vinyl halide polymers and resins, such as vinyl chloride, characterized by their resistance to the deteriorative effect of heat. Although the stabilizing process of this invention may be used to stabilize both flexible and rigid resins, the results may be particularly outstanding when this system is used in connection with flexible resins. The degree of stabilization attained in such systems may be considerably in excess of that previously attainable by any prior art stabilizer system. Because of the outstanding properties of this novel stabilizer system, it is possible to effect stabilization with lower quantities of stabilizer and thereby to obtain a more effective system on a cost-performance basis.

In order to point up clearly the novel features of this invention and to illustrate the unexpected and outstanding results which may be attained by practice of this invention, the following illustrative examples may be set forth wherein all parts are parts by weight unless otherwise indicated.

In these examples, the rigid vinyl chloride polymer employed was that having a specific gravity of 1.40, a Shore Durometer hardness "D" of 80, and an ultimate tensile strength of about 7000 p.s.i. sold under the trademark Geon 103 EP.

The illustrative first stabilizer was butyl thiostannoic acid having an $n$ value of 4.5. The second stabilizer employed in these illustrative tests was 2,6-di-tert-butyl-p-cresol.

The selected compositions were thoroughly blended by placing the polyvinyl chloride on a two-roll differential mill, which was oil-heated to a temperature of 163° C.–205° C., together with the noted quantity of first stabilizer and second stabilizer (if any); and the mixture was milled for about 5 minutes. A continuous band of the composition formed around one of the rollers. This band was cut and the composition was removed from the hot roller as a continuous sheet. Squares of this material measuring 2.54 cm. x 2.54 cm. were cut for heat stability testing. The squares were placed in an air-oven regulated to maintain a temperature of 190° C. Samples of each composition were removed from the oven at 15-minute intervals and were rated visually as to color change and degradation according to the following scale:

7—clear, water-white
6—off-white
5—slightest degree of yellowing
4—definite yellow color
3—deep yellow-brown color
2—deep brown color
1—dark brown to black color.

The length of time in minutes required to reach a value of 3 or less was recorded as the Heat Stability Value.

In Example 1 as hereinafter set forth, the vinyl chloride polymer was tested without addition of any stabilizer and thus may serve as a control. In control Example 2 the first stabilizer, butyl thiostannoic acid having an $n$ value of 4.5 was added in amount of 0.55 part; and no second stabilizer was employed. In control Example 3 the second stabilizer was 2,6-di-tert-butyl-p-cresol; and no first stabilizer was present. The second stabilizer in Example 3 was present in amount of 0.55 part per 100 parts of vinyl chloride polymer.

In experimental Example 4, carried out in accordance with practice of this invention, 0.35 part of first stabilizer butyl thiostannoic acid having an $n$ value of 4.5, and 0.20 part of second stabilizer 2,6-di-tert-butyl-p-cresol were added to 100 parts of the vinyl chloride polymer.

The results of the heat stability tests are presented in Table I. In this table, as elsewhere, the heat stability value is abbreviated HSV and is set forth in minutes. The color recorded may be that after the resin and additive have been thoroughly blended on the mill and corresponds to color at time zero.

TABLE I

| Ex. | HSV (minutes) | Color |
| --- | --- | --- |
| 1 | 0 | 2 |
| 2 | 0 | 3+ |
| 3 | 0 | 4 |
| 4 | 30 | 7 |

As is apparent from Table I, the resin of control Example 1 to which no stabilizer had been added had an undesirable color rating of 2 (at the end of only 1 minute of milling). The samples of Example 2 and 3 after four minutes and three minutes of milling had color ratings of 3+ and 4 respectively at which point they stuck to the mill. It is thus apparent that these resin specimens had discolored and become stuck to the mill during normal milling. In contrast, the sample of Example 4, prepared in accordance with the process of this invention, was unexpectedly found to have a color rating of 7 after 5 minutes of milling. It is thus apparent that during milling, for the normal milling time, the sample of Example 4 was characterized by outstandingly high resistance to deterioration from heat.

Furthermore it will be noted that the heat stability value of the resins of Examples 1 and 2 and 3 were unexpectedly 0, 0, and 0. In contrast, the heat stability value of the sample of Example 4 was unexpectedly 30 minutes which was substantially greater than that of the unstabilized resin and substantially greater than the heat stability values of the control resin of Examples 1, 2, and 3.

Accordingly it will be apparent to those skilled-in-the-art that practice of the novel process of this invention permits attainment of polymeric resins characterized by extremely high degree of heat stability.

It is a particular feature of the novel stabilizer systems of this invention that they are unexpectedly characterized by an outstandingly superior dynamic mill stability. Dynamic mill stability may be measured in standard manner by placing 100 parts of resin together with additives to be tested in predetermined amount, on a 2-roll differential mill which heated to a temperature of 176° C. The mixture may then be milled continuously for an indefinite period of time. The milled resin may be observed every 5 minutes and tested to determine whether or not it is sticking to the mill. This may be observed by attempting to remove portions of the resin from the mill with a spatula. When the resin can no longer be removed from the heated roller it is said to have stuck and the time at which this occurs may be recorded as the dynamic mill stability time.

The samples of Examples 1–4 were subjected to the dynamic mill stability test, and the following results were observed:

TABLE II

| Example: | Dynamic mill stability, minutes |
|---|---|
| 1 | 1 |
| 2 | 4 |
| 3 | 3 |
| 4 | 14 |

As will be apparent from inspection of Table II, the Dynamic Mill Stability of the control having no stabilizer present was 1 minute. The dynamic mill stability of the samples of Examples 2 and 3, containing respectively either the first stabilizer or second stabilizer, was 4 and 3 minutes. The sample of Example 4, prepared in accordance with this invention was found to have a dynamic mill stability value of 14 minutes which, as is apparent, is outstandingly better than the corresponding values for control Examples 1, 2, and 3.

Other illustrative examples of preferred stabilizer systems which may fall within the scope of the invention and permit attainment of properties familiar to those hereinbefore set forth may include the following:

(A)

| | Parts |
|---|---|
| Vinyl chloride homopolymers | 100 |
| Butyl thiostannoic acid | 3 |
| 2,6-di-tert-butyl-p-cresol | 0.1 |

(B)

| | |
|---|---|
| Vinyl chloride-vinyl acetate copolymer | 100 |
| Butyl thiostannoic acid | 4 |
| 2,4,6-tri-isopropylphenol | 0.5 |

(C)

| | |
|---|---|
| Vinylidene chloride homopolymer | 100 |
| Butyl thiostannoic acid | 3 |
| 2,6-di-isobutyl-4-ethyl-phenol | 0.4 |

(D)

| | |
|---|---|
| Vinyl chloride homopolymer | 100 |
| Butyl thiostannoic acid | 4 |
| 2,6-di-isoamyl-4-n-propyl phenol | 0.2 |

(E)

| | |
|---|---|
| Vinyl chloride homopolymer | 100 |
| Octyl thiostannoic acid | 2 |
| 2,4,6-tri-tert-butylphenol | 0.1 |

(F)

| | |
|---|---|
| Vinyl chloride homopolymer | 100 |
| Cyclohexyl thiostannoic acid | 3 |
| 2,6-di-tert-butyl-4-nonylphenol | 0.3 |

Although this invention has been illustrated by reference to specific examples, changes therein which clearly fall within the scope of the invention will be apparent to those skilled-in-the-art. It is therefore, to be limited solely by the scope of the appended claims.

We claim:

1. A novel stable halogen-containing organic polymer composition comprising a halogen-containing organic polymer selected from the group consisting of homopolymers of vinyl chloride or vinylidene chloride, and copolymers of vinyl chloride and vinylidene chloride with other ethylenically unsaturated monomers and a stabilizing amount of: a first stabilizer having the formula $(RSnX_{1.5})_n$ wherein R is selected from the group consisting of alkyl having 1 to 20 carbon atoms, aryl, alkaryl, aralkyl, and cycloalkyl, X is selected from the group consisting of oxygen and sulfur and mixtures of 1–10 parts of oxygen with 10–1 parts of sulfur, and $n$ is an integer 2–1000; and a second stabilizer having the formula

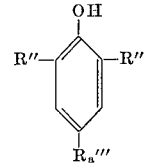

wherein R″ is a branched alkyl containing less than 10 carbon atoms, R‴ is an alkyl containing less than 10 carbon atoms, and $a$ is a number 0–1.

2. A novel stable halogen-containing organic polymer composition as claimed in claim 1 wherein R″ is a branched alkyl containing 3–5 carbon atoms.

3. A novel stable halogen-containing organic polymer composition as claimed in claim 1 wherein R is butyl.

4. A novel stable vinyl chloride polymer composition comprising 100 parts by weight of a vinyl chloride polymer; 0.1–10 parts of a first stabilizer having the formula $(RSnX_{1.5})_n$ wherein R is selected from the group consisting of alkyl having 1 to 20 carbon atoms, aryl, alkaryl, aralkyl, and cycloalkyl; X is selected from the group consisting of oxygen and sulfur and mixtures of 1–10 parts of oxygen with 10–1 parts of sulfur, and N is an integer 2–1000 and 0.05–2 parts of a second stabilizer having the formula

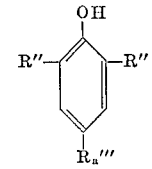

wherein R″ is a branched alkyl containing less than 10 carbon atoms, R‴ is an alkyl containing less than 10 carbon atoms, and $a$ is a number 0–1.

5. A novel stable vinyl chloride polymer composition comprising 100 parts by weight of a vinyl chloride polymer; about 0.25–2 parts by weight of a first stabilizer having the formula $(RSnX_{1.5})_n$ wherein R is selected from the group consisting of alkyl having 1 to 20 carbon atoms, aryl, alkaryl, aralkyl, and cycloalkyl; X is selected from the group consisting of oxygen and sulfur and mixtures of 1–10 parts of oxygen with 10–1 parts of sulfur, and N is an integer 2–1000 and 0.1–0.5 part of a second stabilizer having the formula

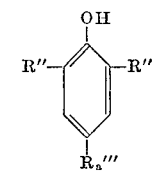

wherein R″ is a branched alkyl containing less than 10 carbon atoms, R‴ is alkyl containing less than 10 carbon atoms, and $a$ is a number 0–1.

6. A novel stable vinyl chloride polymer composition as claimed in claim 5 wherein R″ is a branched alkyl containing 3–5 carbon atoms.

7. A novel stable vinyl chloride polymer composition as claimed in claim 5 wherein R‴ is an alkyl containing 1–4 carbon atoms.

8. A novel stable vinyl chloride polymer composition as claimed in claim 5 wherein R is butyl.

9. A novel stabilizer composition useful for the preparation of stable vinyl chloride polymer compositions which comprises 0.1–10 parts of a first stabilizer having the formula $(RSnX_{1.5})_n$ wherein R is selected from the group consisting of alkyl having 1 to 20 carbon atoms, aryl, alkaryl, aralkyl, and cycloalkyl; X is selected from the group consisting of oxygen and sulfur and mixtures of 1–10 parts of oxygen with 10–1 parts of sulfur, and N is an integer 2–1000 and 0.05–2 parts of a second stabilizer having the formula

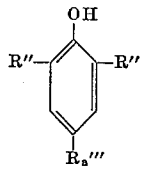

wherein R″ is a branched alkyl containing less than 10 carbon atoms, R‴ is alkyl containing less than 10 carbon atoms, and $a$ is 0–1.

10. A novel stabilizer composition as claimed in claim 9 wherein R″ is a branched alkyl containing 3–5 carbon atoms.

11. A novel stabilizer composition as claimed in claim 9 wherein R‴ is alkyl containing 1–4 carbon atoms.

12. A novel stabilizer composition as claimed in claim 9 wherein R is butyl.

13. A novel stabilizer composition useful for the preparation of stable vinyl chloride polymer compositions which comprises about 0.1–10 parts by weight of a first stabilizer having the formula $(RSnS_{1.5})_n$ wherein R is selected from the group consisting of an alkyl radical having 1 to 20 carbon atoms, aryl, alkaryl, aralkyl, and a cycloalkyl radical; and 0.1–0.5 part of a second stabilizer having the formula

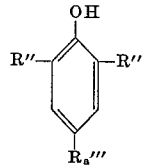

wherein R″ is a branched alkyl containing less than 10 carbon atoms, R‴ is alkyl containing less than 10 carbon atoms, and $a$ is 0–1.

14. A novel stabilizer composition as claimed in claim 13 wherein R″ is a branched alkyl containing 3–5 carbon atoms.

15. A novel stabilizer composition as claimed in claim 13 wherein R‴ is an alkyl containing 1–4 carbon atoms.

16. A novel stabilizer composition as claimed in claim 13 wherein R is butyl.

References Cited

UNITED STATES PATENTS 2,919,259  12/1959  Naylor et al. _____ 260—45.95
3,021,302  2/1962  Frey et al. _____ 260—45.75

DONALD E. CZAJA, *Primary Examiner.*

V. P. HOKE, *Assistant Examiner.*

252—400, 404; 260—45.95